United States Patent
Freier et al.

[11] Patent Number: 6,123,442
[45] Date of Patent: Sep. 26, 2000

[54] ARTICLES WITH DIFFUSE REFLECTION OF LIGHT FROM LIGHT FIBERS

[75] Inventors: David George Freier; Cheryl Annette Vrieze, both of St. Paul, Minn.

[73] Assignee: Minnesota Mining and Manufacturing Company, St. Paul, Minn.

[21] Appl. No.: 08/957,573

[22] Filed: Oct. 24, 1997

[51] Int. Cl.[7] .................................................. F21V 8/00
[52] U.S. Cl. ........................... 362/559; 385/901; 40/547; 362/560; 362/581; 362/582
[58] Field of Search .................... 362/558, 559, 362/560, 581, 582; 40/546, 547; 385/133, 901

[56] References Cited

U.S. PATENT DOCUMENTS

| | | | |
|---|---|---|---|
| 3,497,981 | 3/1970 | Tyne | 350/96.1 X |
| 4,195,907 | 4/1980 | Zamja et al. | 362/582 X |
| 4,422,719 | 12/1983 | Orcutt | 350/96.3 |
| 4,733,332 | 3/1988 | Yamashita et al. | 362/32 |
| 4,750,798 | 6/1988 | Whitehead | 385/133 |
| 4,977,487 | 12/1990 | Okano | 362/32 |
| 4,996,632 | 2/1991 | Aikens | 362/558 X |
| 5,027,259 | 6/1991 | Chujko | 362/32 |
| 5,339,382 | 8/1994 | Whitehead | 385/901 X |
| 5,416,608 | 5/1995 | Ueda et al. | 358/474 |
| 5,537,297 | 7/1996 | Ghandehari | 362/32 |
| 5,542,017 | 7/1996 | Koike | 385/123 |
| 5,606,634 | 2/1997 | LeBihan | 385/31 |
| 5,615,090 | 3/1997 | Kato | 362/32 |
| 5,662,403 | 9/1997 | Akashi et al. | 362/32 |
| 5,710,856 | 1/1998 | Ishii et al. | 385/901 X |
| 5,799,124 | 8/1998 | Zorn et al. | 385/125 |
| 5,806,263 | 9/1998 | Coleman | 52/306 |

FOREIGN PATENT DOCUMENTS

| | | | |
|---|---|---|---|
| 2591 717 | 8/1986 | France | F21V 13/12 |
| 41 31 340 C1 | 9/1991 | Germany | G09F 9/00 |
| 44 07 498 A1 | 9/1995 | Germany . | |
| 58-007603 | 1/1983 | Japan . | |
| 1-187505 | 7/1989 | Japan . | |
| 7-198947 | 8/1995 | Japan . | |
| 7-198951 | 8/1995 | Japan . | |
| 7-198953 | 8/1995 | Japan . | |
| 8-15527 | 1/1996 | Japan . | |
| 8-146226 | 6/1996 | Japan . | |
| WO 95/16877 | 6/1995 | WIPO . | |
| WO 97/08571 | 3/1997 | WIPO . | |
| WO 97/38263 | 10/1997 | WIPO . | |
| WO 98/20279 | 5/1998 | WIPO | F21V 8/00 |

OTHER PUBLICATIONS

Abstract of Japanese Patent Application No. J01105206–A, dated Apr. 21, 1989.
Abstract of German Patent Application No. DE 4326521 A, dated Feb. 17, 1994.
Abstract of Japanese Patent Application No. JP 7–198948, dated Aug. 1, 1995.
Abstract of Japanese Patent Application No. JP 8–313708, dated Nov. 29, 1996.
Abstract of Japanese Patent Application No. JP 8–313891, dated Nov. 29, 1996.
Abstract of Japanese Patent Application No. JP 8–329716, dated Dec. 13, 1996.

*Primary Examiner*—Laura K. Tso
*Attorney, Agent, or Firm*—Merchant & Gould P.C.

[57] ABSTRACT

An article configured for emitting diffuse light in a predetermined set of directions when coupled with a light source includes a light fiber and a diffuse reflective sheet material disposed around at least a portion of the light fiber to direct at least a portion of the light emitted by the light fiber toward the predetermined set of directions. The light fiber has a light receiving end for coupling to the light source and the light fiber emitting light when coupled to the light source. A variety of diffuse reflective sheet materials can be used including, for example, microvoided sheet materials, such as those made by the TIPS ("thermally induced phase separation") method, and microporous sheet materials.

27 Claims, 3 Drawing Sheets

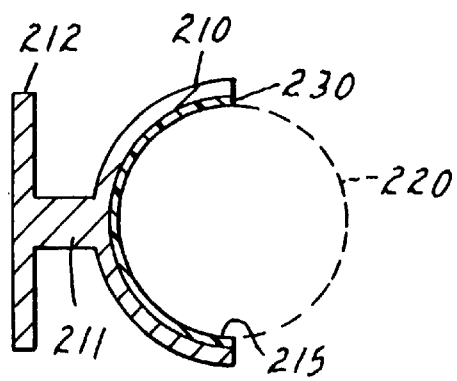
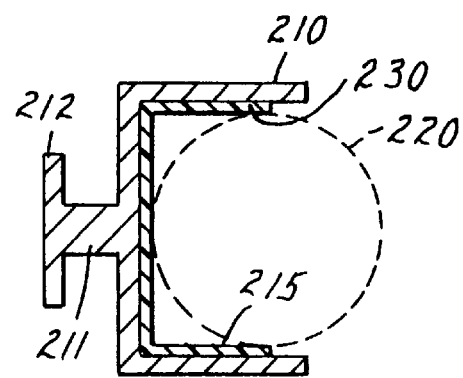
FIG. 4A     FIG. 4B
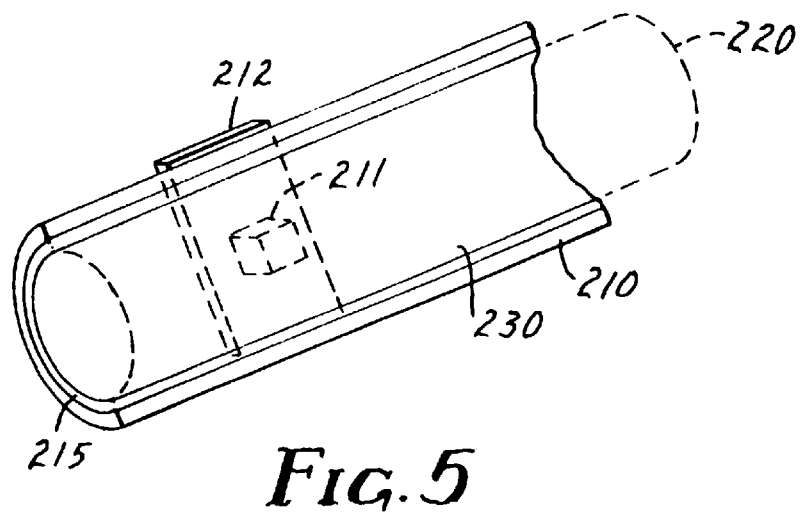
FIG. 5

ARTICLES WITH DIFFUSE REFLECTION OF LIGHT FROM LIGHT FIBERS

FIELD OF THE INVENTION

This invention is directed in general to articles that are illuminated using light fibers and methods for making and using these articles. More particularly, the invention is directed to articles with structures to provide enhanced diffuse reflection of light from light fibers and to methods for making and using these articles.

BACKGROUND OF THE INVENTION

Light fibers are often useful for illuminating an area that is remote from a light source by conducting light through the fiber by total internal reflection. These fibers can be made with varying diameter and length. Light fibers having a diameter of 5 mm or greater are often referred to as "large core optical fibers" and have been used, for example, as accents for architectural features, as lights for areas that would otherwise be hazardous due to the presence of, for example, the heat or electricity present with incandescent or fluorescent lights (e.g., underwater or poolside lights), and as building or vehicle interior lights.

Light can be emitted from light fibers in a number of ways. First, light can be emitted from the end of the light fiber. This type of light emission may be referred to as "end-light". Most light fibers provide at least some "end-light". Many light fibers are designed to maximize internal reflection so that the primary function of the light fiber is to conduct light from a light source to a remote location. The light emitted by this type of light fiber is primarily "end-light".

Second, light can be emitted radially along a portion of or over the entire length of the light fiber. This light is often referred to as "side-light". Most light fibers emit this type of light, which is often due to imperfections in the light fiber, including imperfections in the core and cladding of the light fiber and/or an imperfect interface between the core and cladding. For light fibers which are designed to maximize internal reflection, this type of light emission is minimized; however, there is typically at least some minimal amount of "side-light" which is often seen as a faint glow around the light fiber. The "side-light" is typically a diffuse light.

Light fibers may also be formed which purposefully include mechanisms or structures for extracting light along the length or a portion of the length of the fiber. For example, imperfections in the core or cladding or at the interface between the core and cladding may be introduced to interrupt the internal reflection of at least a portion of the light. Examples of one method for extracting light in this manner are provided in U.S. patent application Ser. No. 08/957,554, entitled "Optical Waveguide with Diffuse Light Extraction", filed Oct. 24, 1997 by David George Freier, Joseph John Bianconi, and Richard Decena Ornelaz, Jr. These light fibers can be used, for example, as visible or decorative articles for providing a ribbon of light along a distance. Light extracted in this manner is typically diffuse.

Another method of extracting light includes redirecting light in a controlled manner out of the light fiber by means of optical elements introduced into the light fiber core or applied directly thereto, such that the function of the light fiber is to conduct light from a source to a specific location other than the end of the fiber. This method of extraction may provide diffuse light; but is more commonly used to produce directed light. Such fibers may be used to provide directed light at particular points or positions, for example, on a screen or other object.

Often, however, it is desirable to provide diffuse light which is directed in a particular set of directions, rather than emanating in all directions. For example, light from a desk lamp is typically diffuse light so that it provides a wide area of illumination. However, the light is preferably directed toward the desk. Diffuse light which is emitted from a light source, such as an incandescent or fluorescent light bulb, in the desk lamp, however, is typically emitted in all directions. This is an inefficient use of the light because not all of the light is properly directed. A significant portion of the light is radiated away from the desired illumination location.

Light fibers can be an efficient way to transmit light and illuminate desired areas using light from a distant light source. However, just as with other light sources, light fibers may not efficiently direct the emitted light, especially if the light is "side-light" or diffusely extracted. There is a need for devices and methods for efficiently directing diffuse light from a light fiber in a set of directions to illuminate a desired area with diffuse light.

SUMMARY OF THE INVENTION

Generally, the present invention relates to articles having a light fiber for illumination and diffusive reflective material around a portion of the light fiber to direct the light from the light fiber in a desired set of directions and provide diffuse illumination. Typically, the illumination in the desired set of directions is brighter than if the light fiber were used alone. The present invention is also directed to methods of using and manufacturing these articles.

One embodiment of the invention is an article configured for emitting diffuse light in a predetermined set of directions when coupled with a light source. The article includes a light fiber having a light receiving end coupled to the light source and a diffuse reflective sheet material disposed around at least a portion of the light fiber to direct at least a portion of the light emitted by the light fiber toward the predetermined set of directions. The light fiber emits light when coupled to the light source.

Another embodiment of the invention is an illuminated article which includes a light source, a light fiber having a light receiving end which is positioned to receive light from the light source and a diffuse reflective sheet material which is disposed around at least a portion of the light fiber to direct light toward a predetermined set of directions.

A further embodiment is a method of making a diffusive illumination device which includes disposing a diffuse reflective sheet material around at least a portion of a light fiber.

Yet another embodiment is a method of providing diffuse illumination in a predetermined set of directions. The method includes disposing a diffuse reflective sheet material around at least a portion of a light fiber to direct light emitted from the light fiber in the predetermined set of directions and coupling a light source to a receiving end of the light fiber.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 4A and 4B are cross-sectional views of two embodiments of an article for diffuse emission of light in a set of desired directions and formed with a bracket or holder according to the invention;

FIG. 5 is a perspective view of the article of FIG. 4A;

Figure 1:
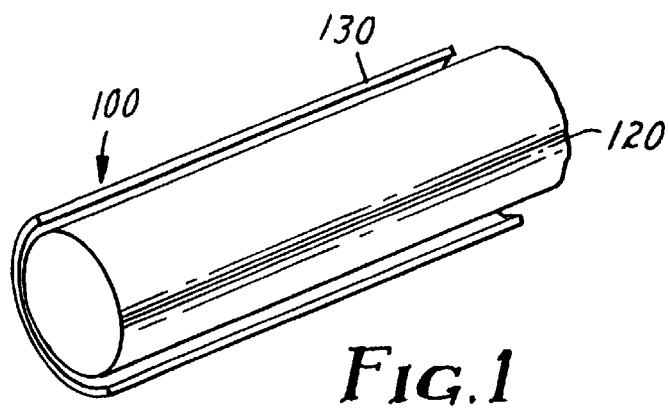
FIG. 1 is a perspective view of one embodiment of an article for diffuse emission of light in a set of desired directions according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The invention is directed to articles having a light fiber which provides diffuse light in a desired set of directions. The invention is also directed to methods for making and using these articles. The term "light" is intended to include any form of electromagnetic radiation, but particularly radiation in the spectrum of visible light (approximately 400 to 700 nm wavelength). While the present invention is not so limited, an understanding of various aspects of the invention is best gained through a discussion of various application examples in which the light fiber is a large core optical fiber. Other light fibers including small core optical fibers may also be used. Furthermore, although the embodiments described below and illustrated in the drawings typically include only a single light fiber, it will be understood that multiple light fibers could also be used in place of the single light fiber.

One method of directing light is by reflection, including specular reflection and diffuse reflection. Specular reflection refers to mirror-like reflection, in which light is reflected at an angle equal but opposite to that of the incident radiation. In contrast, diffuse reflection provides reflective luminance over a range of angles, regardless of the angle that the incident radiation makes with respect to the macroscopic surface of the diffuse reflective sheet material. It is this property of diffuse reflective sheet material that allows such material to be used to reflect even highly directed light and provide diffuse light over an illumination area.

Referring to FIG. 1, an article 100 for emitting diffuse light in a desired set of directions includes a light fiber 120 and a diffuse reflective sheet material 130 which is provided around at least a portion of the light fiber. A cross-sectional view, FIG. 2, of the article 100 shows that a portion of the light which is emitted from the light fiber 120 is reflected by the diffuse reflective sheet material 130 and eventually is directed away from the light fiber 120 and the diffuse reflective sheet material 130. The region of the light fiber 120 which is surrounded by the diffuse reflective sheet material 130 can be chosen so that light from the light fiber 120 is emitted from the article only in a desired set of directions (i.e., one or more directions). The light seen by an observer includes light rays 140 directly exiting the light fiber 120 and light rays 150 that have been reflected by the diffuse reflective sheet material 130. The light rays 150 may reflect more than once off the diffuse reflective sheet material 130.

In some embodiments, the diffuse reflective sheet material is in direct contact with the light fiber. In other embodiments, the diffuse reflective sheet material 130 is spaced apart from the light fiber 120 (as shown in FIG. 2).

Figure 2:
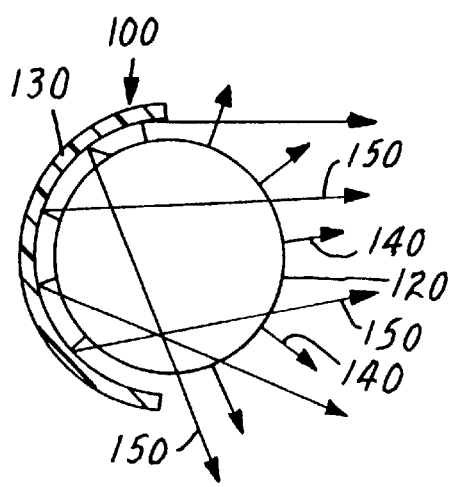
FIG. 2 is a cross-sectional view of the article of FIG. 1 having a light fiber with diffuse light extractors according to the invention.
Figure 3:
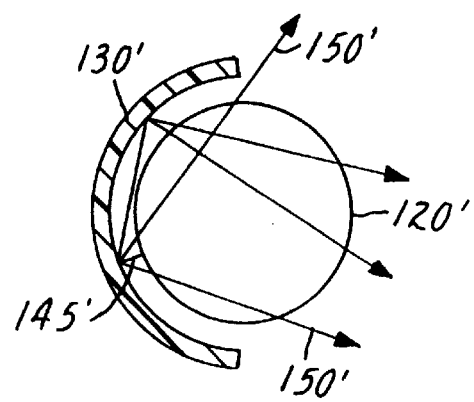
FIG. 3 is a cross-sectional view of another embodiment having a light fiber with directed light extractors according to the invention.

FIG. 2 illustrates a light fiber 120 which emits "sidelight" or light diverted from the light fiber by diffuse light extraction techniques. However, diffuse reflective sheet material may also be used with a light fiber having directed light extractors. FIG. 3 illustrates one particular embodiment of the invention with a light fiber 120' which is oriented so that the directed light extractors (not shown) in the light fiber direct light 145' toward a diffuse reflective sheet material 130'. Light 150' is then reflected off the diffuse reflective sheet material 130' over a range of directions. In some cases, light may be reflected by the diffuse reflective sheet material 130' several times before it finally escapes.

The use of diffuse reflective sheet material 130 with the light fiber 120 may increase the brightness of the light directed in the desired set of directions as compared to light produced by a light fiber without the diffuse reflective sheet material 130. Preferably, the brightness is increased by at least 10%, more preferably by at least 25%, even more preferably by at least 50%, and most preferably by at least 100%. In some cases, the brightness increases by 200% or more.

In some embodiments, the light fiber 220 may be placed in a bracket or holder 210 having a channel 215 around the light fiber, as shown in FIGS. 4A and 4B. The diffuse reflective sheet material 230 may be disposed on the inner surface of the channel 215 for reflecting light away from the holder 210. The holder 210 may also include a connecting neck 211 and a support or foot 212, which can be fastenably mounted to a wall or panel or other supporting structure (not shown). A plurality of supports 212 may be provided along the length of the light fiber 220. Alternatively, the support 212 may be a single device having a length comparable to the length of the light fiber 220 and/or the diffuse reflective sheet material 230. Furthermore, the light fiber 220 may be shaped in a desired pattern.

The light fiber 220 may be, for example, frictionally fitted or adhesively mounted in the channel 215, so that it remains in place. FIG. 4A shows a circular design for channel 215 and FIG. 4B shows a square design for channel 215. It will be understood that other shapes and configurations may be similarly used for the channel 215 and holder 210.

A perspective view of the light fiber 220 and holder 210 is presented in FIG. 5. The diffuse reflective sheet material 230 is provided on the inner surfaces of the channel 215 and extends for a distance along the length of the light fiber 220. The diffuse reflective sheet material 230 may extend the entire length of the channel 215, particularly when uniform illumination is desired.

Figure 6:
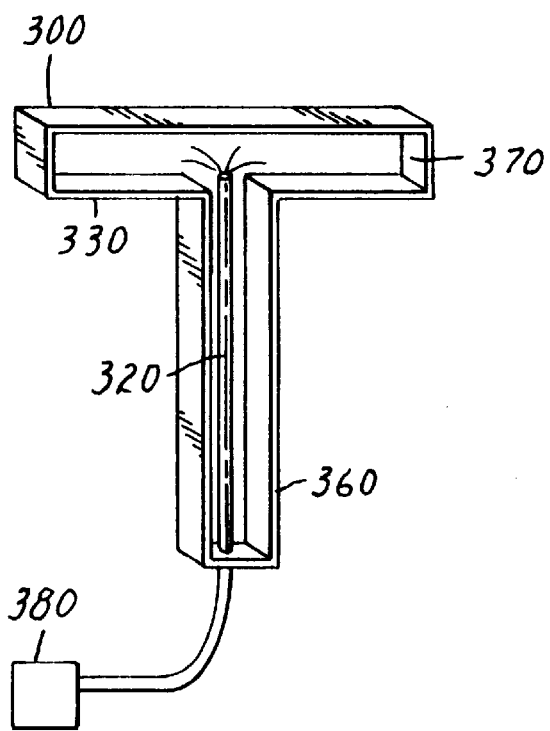
FIG. 6 is a perspective view of one embodiment of a light fiber formed in a box, a portion of the box being coated with a diffuse reflective sheet material, according to the invention.

In some embodiments of the invention, a light fiber 320 may be positioned within a structure 360 which has one or more walls 370, as shown in FIG. 6. The structure 360 may be in the form of a box, as shown in FIG. 6, or may be formed in other shapes as desired. The diffuse reflective sheet material 330 is provided on at least a portion of the walls 370. There are a variety of methods for providing the diffuse reflective sheet material 330 on the walls 370 including, but not limited to, attachment by fasteners, adhesives, and/or friction.

The structure 360 may include a covering (not shown) or a portion of the walls 370 which is transparent or translucent. This covering or portion of the walls may be colored. When light is emitted from the light fiber 320 and reflected from the diffuse reflective sheet material 330, the transparent or translucent covering or portion of the walls 370 becomes luminous.

When the structure 360 includes a translucent region, such as covering or portion of the walls 370, it may be desirable that the luminous intensity be uniform across that the translucent region. This can be accomplished by using a low-transmittance (e.g., less that 30% transmittance) non-absorbing material, such as Plexiglass™. Light emitted by the fiber is then forced to bounce many times within the structure before exiting the translucent portion. Lining the non-translucent walls of the structure with a highly reflective material (reflectivity greater than, e.g., 90%), such as the diffuse reflective sheet material, prevents significant absorption of light by the non-translucent walls, thereby substantially increasing the brightness of the translucent region.

Figure 7:
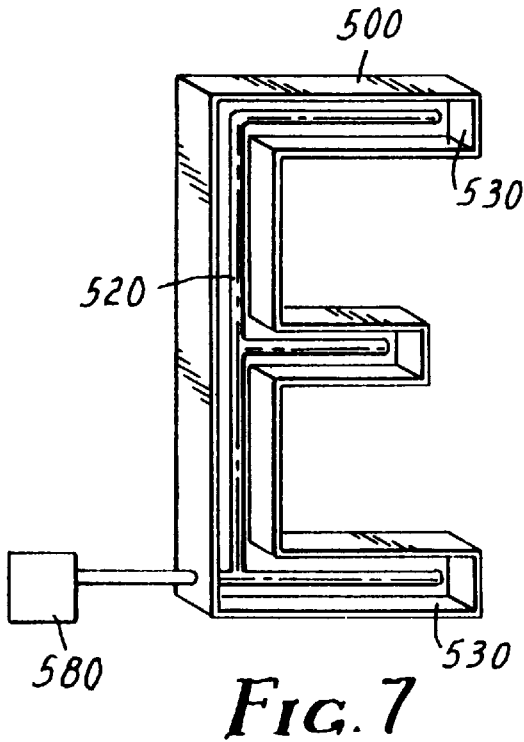
FIG. 7 is a perspective view of another embodiment of a light fiber formed in a box, a portion of the box being coated with a diffuse reflective sheet material, according to the invention.
Figure 8:
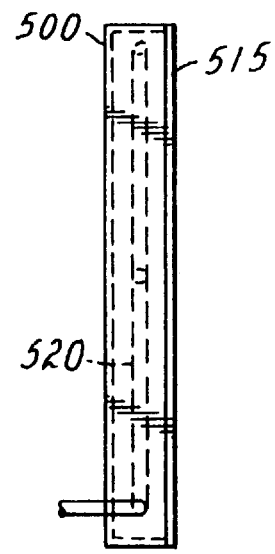
FIG. 8 is a side view of the article of FIG. 7.

Examples of such structures are the channel letters illustrated in FIGS. 6–8. The diffuse reflective sheet material 330 can be used as a light reflective lining for channel lettering, that is, hollow letters, numerals, symbols, or other figures formed in three dimensions and used, for example, in signs. The channel lettering is lit from within by the light fiber and typically has a transparent or translucent front covering and/or walls.

FIG. 6 illustrates a channel letter 300, in the shape of the letter "T", with the cover removed. In this case, light is provided to the interior of channel letter 300 by a light fiber 320 from the end of light fiber 320 (i.e. "end-light"). An external light source 380 is coupled to a light receiving end of the light fiber 320 to illuminate the light fiber. The diffuse reflective sheet material 330 covers the inside of channel letter 300, which may be fabricated from any formable material, for example, sheet metal, glass, fiberglass, wood, plastic, or other polymeric material. The light fiber 320 may be formed roughly in the shape of the channel letter 300, although this is not required.

FIG. 7 illustrates another embodiment of a three-dimensional channel letter 500, this time in the shape of the letter "E", with the front cover removed. An external light source 580 is provided to illuminate the light fiber 520. In this particular embodiment, the light from the light fiber 520 is "side-light" which may optionally be extracted by either diffuse or directed light extractor structures in the light fiber. If directed light extraction is used, then preferably the extracted light is directed toward the portion of the channel letter 500 upon which the diffuse reflective sheet material 530 is provided.

FIG. 8 is a side view of the channel letter 500, showing a cover 515 in place on the front of the channel letter. The cover 515 and/or other portions of the channel letter 500 may be transparent or translucent and can be clear, tinted, or colored and disposed on the face of the letter that is to be seen by a viewer. In some embodiments, more than one of the walls of the channel letter are transparent or translucent. For example, all of the walls except for the back sidewall may be transparent or translucent to allow light to radiate in all directions except backwards.

The channel letters may be used, for example, to create signs. Individual light fibers may be used for each channel letter. Alternatively, a single light fiber may be used for two or more channel letters or two or more light fibers could be used in any of the channel letters.

Many types of light fibers may be used in the articles of the invention. Particularly suitable light fibers are prepared from polymeric materials and are commercially available from sources such as 3M Company (St. Paul, Minn.), Lumenyte International, Inc. (Costa Mesa, Calif.), Fiberstars, Inc. (Fremont, Calif.), Bridgestone Corp. (Tokyo, Japan), Rohm and Haas Co. (Philadelphia, Pa.), and Mitsubishi Rayon Co., Ltd. (Tokyo, Japan).

Figure 9:
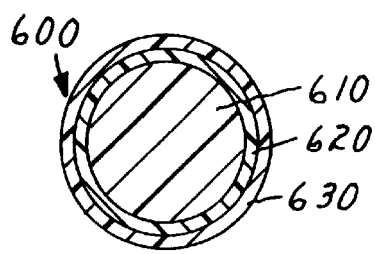
FIG. 9 is a cross-sectional view of an exemplary light fiber for use in the articles of the invention.

An example of a suitable light fiber 600 for use in the articles of the invention is illustrated in FIG. 9. The light fiber 600 typically includes a core 610, a cladding 620, and an optional jacket 630. Such light fibers and a preferred method of making the light fibers, are described, for example, in U.S. Pat. Nos. 5,067,831, 5,122,580, 5,221,387, 5,225,166, and 5,298,327, the disclosures of which are incorporated herein by reference. For example, the core 610 may be formed from a polymeric material, including methacrylates, such as n-butyl methacrylate and 2-ethylhexyl methacrylate. The core may, for example, be prepared by copolymerizing at least one methacrylate monomer derived from the esterification of methacrylic acid with an alcohol having at least 4 carbon atoms and an ethylenically-unsaturated, free-radical polymerizable crosslinking agent.

Particularly useful methacrylate monomers derived from the esterification of methacrylic acid with an alcohol having at least 4 carbon atoms include, for example, n-butyl methacrylate, n-hexyl methacrylate, 2-ethylhexyl methacrylate, n-octyl methacrylate, iso-octyl methacrylate, n-decyl methacrylate, and dodecyl methacrylate, and combinations thereof. Preferred methacrylate monomers include n-butyl methacrylate, n-hexyl methacrylate, 2-ethylhexyl methacrylate, n-octyl methacrylate, and combinations thereof.

Crosslinking agents useful in light fibers are those ethylenically-unsaturated, free-radical polymerizable compounds possessing two or more free-radical polymerizable, ethylenically-unsaturated reactive moieties, such as, for example, acrylate, methacrylate, allyl, or styryl groups, or the like. Preferred crosslinking agents are dimethacrylates and diallyl compounds, most preferably dimethacrylate compounds. Useful dimethacrylate compounds include, for example, hexanediol dimethacrylate, ethylene glycol dimethacrylate, diethylene glycol dimethacrylate, triethylene glycol dimethacrylate, tetraethylene glycol dimethacrylate, propylene glycol dimethacrylate, trimethylol propane dimethacrylate, and methacrylate-terminated oligomers such as polyethylene glycol dimethacrylate and polypropylene oxide dimethacrylate, and combinations thereof. Preferred dimethacrylate crosslinking agent include diethylene glycol dimethacrylate, triethylene glycol dimethacrylate, tetraethylene glycol dimethacrylate, propylene glycol dimethacrylate, and combinations thereof.

In particular, one suitable core material includes a 1:1 mixture by weight of n-butyl methacrylate and 2-ethylhexyl methacrylate, which, in turn, can contain 0.05% by weight triethylene glycol dimethacrylate crosslinking agent and 0.2% by weight di(4-t-butylcyclohexyl)peroxydicarbonate (Perkadox 16™, Akzo Nobel Chemicals, Inc., Chicago, Ill.) thermal initiator. Additional materials and examples are presented in U.S. Pat. No. 5,225,166, incorporated herein by reference.

In some embodiments, intimate contact between the core 610 and the cladding 620 is needed for extraction of light. In these embodiments, the core 610 may be made from a flowable material which can, over time, flow around the inner surface of the cladding 620 to form an outer surface of the core 610 which is complementary to the inner surface of the cladding 620. Such core materials include, for example, the methacrylate core materials described above. In some cases, the core may be formed by allowing raw core material to flow into the cladding and then polymerizing the core material in situ. If the core does not flow or flows slowly, a fluid having the same or nearly the same index of refraction (typically less than a 2% difference) can be included between the core and the cladding to help ensure proper optical contact between the core 610 and the cladding 620. This fluid may also be used even if the core flows around the cladding. Suitable fluids include, for example, a siloxane copolymer (PS 785, Petrarch Silanes, United Chemical Technologies, Inc., Bristol, Pa.), having an index of refraction (1.465 at 583 nm) nearly identical to the core. Other suitable index matching fluids are known in the art.

The cladding 620 can be formed from a variety of different compounds. As an example, fluoropolymer tubing has been found to be useful as a cladding for the light fiber. Examples of suitable fluoropolymer tubing include Teflon-100™ fluorinated ethylene polymer tubing (FEP tubing, DuPont Chemicals Co. Fluoropolymer Division, Wilmington, Del.), Teflon poly(tetrafluoroethylene) (PTFE) tubing (DuPont), THV tubing (a terpolymer of tetrafluoroethylene, hexafluoropropylene, and vinylidene fluoride, available from Dyneon, Inc., St. Paul, Minn.) or other similar commercially-available highly fluorinated polymeric tubing (e.g., tubing from Zeus Industrial Products, Inc., Raritan, N.J.). Preferably, the tubing is a heat-shrinkable tubing.

In many embodiments, the core 610 is disposed within the cladding 620 after the inner surface of the cladding is formed. The core 610 may be disposed in the cladding 620 by a variety of methods, including, for example, sliding a solid core into the cladding or pouring a liquid core or core material into the cladding and optionally solidifying or polymerizing the core or core material. If the cladding 620 is heat shrinkable, it may be more tightly formed around the core 610 by application of heat.

End-light light fibers useful in the invention are commercially available from, for example, 3M Company (St. Paul, Minn.) or Lumenyte International Corp. (Costa Mesa, Calif.), which often have diameters from about 5 mm to about 20 mm. In particular, light fibers are available in diameters of 7 mm. 9 mm, 12 mm, and 18 mm.

So-called side-light light fibers are also commercially available from 3M Company (St. Paul, Minn.) or Lumenyte International Corp. (Costa Mesa, Calif.). Many of these light fibers, however, do not provide brightness equivalent to, for example, a neon light. However, U.S. patent application Ser. No. 08/957,554, entitled "Optical Waveguide with Diffuse Light Extraction", filed Oct. 24, 1997 by David George Freier, Joseph John Bianconi, and Richard Decena Ornelaz, Jr., incorporated herein by reference, describes methods of achieving bright light fibers with diffuse light extraction. The light fibers are prepared by roughening the interior of the cladding. Rough or uneven areas of the cladding cause increased light extraction from the sides of the light fiber, because each depression or protrusion is a location at which light can be scattered away from the core.

The degree of roughening of the cladding may be provided in a controlled, graded manner prior to filling the cladding such that light emitted by the light fiber is uniform in brightness over the length of the light fiber. The greatest amount of light in the light fiber is available for extraction immediately adjacent to the light source. Diminishing amounts of light are available further down the core because light has already been extracted. Graded extraction is preferably carried out so that the least amount of light extraction takes place closest to the light source and the greatest amount takes place farthest away from the source.

For long light fibers, light sources may be provided at both ends of the light fiber. In this case, the degree of roughening of the cladding interior preferably is the greatest at the middle of the light fiber, at a point equidistant from both light sources, if the light sources are of equal intensity.

In some embodiments, the light fiber is flexible. This allows the light fiber to be formed into a variety of shapes even after the light fiber has been made. In at least some embodiments, the diffuse reflective sheet material is also flexible, particularly if the diffuse reflective sheet material is in direct contact with the light fiber. In other embodiments, the light fiber and/or the diffuse reflective sheet material may be stiff or difficult to bend. In these cases, the light fiber is typically produced in the desired shape and cannot later be changed.

A variety of diffuse reflective materials are known including, for example, white inorganic pigments in the form of a pressed cake, ceramic tile or opal glass. These materials may be expensive, stiff and brittle.

Diffuse reflective sheet materials include microvoided particle-filled sheets that are diffusely reflective due to differences in refractive index of the particles, the surrounding matrix, and air-filled voids created or enlarged by, for example, stretching. In addition, microporous materials made from, for example, sintered polytetrafluoroethylene (PTFE), made in sheet form, can also act as diffuse reflective material.

Preferred diffuse reflective sheet materials for use in the invention include any sheet material having a reflectivity of at least about 90%, preferably at least about 92%, and more preferably at least about 94%, as measured according to ASTM E 1164-94 at a wavelength of 550 nm. Specific sheet materials useful in the invention include, but are not limited to, sintered poly(tetrafluoroethylene) as described in U.S. Pat. No. 5,596,450; filled polyolefin reflective sheets such as those described in European Patent Application No. 724,181; biaxially stretched white polyester laminated film such as is described in U.S. Pat. No. 5,672,409; Tyvek™ nonwoven polyethylene fabric (DuPont Co., Wilmington, Del.); Melinex™ titania-filled microvoided polyethylene terephthalate (ICI Plastics, Wilmington, Del.); ScotchCal™ vinyl sheet material (3M Company, St. Paul, Minn., e.g., catalog numbers 7725-20 and 3630-20); white films such as Gerber™ catalog numbers 220-20 and 230-20 (Gerber Scientific, Inc., South Windsor, Conn.); Poreflon™-brand polytetrafluoroethylene sheet material (Sumitomo Electric Industries, Osaka, Japan) paper-like synthetic poly(ethylene terephthalate) (PET) sheet materials; and similar microporous or filled sheet materials, so long as the sheet materials exhibit the required reflectivity.

Another particularly suitable diffuse reflective sheet material comprises a microporous polyolefin material such as described in U.S. Pat. Nos. 4,539,251, 4,726,989, and 4,867,881, incorporated herein by reference, which may be referred to as a TIPS sheet material. TIPS means "thermally induced phase separation." TIPS sheet material typically includes a thermoplastic polymeric structure having a plurality of cells with adjacent cells being interconnected by passageways to provide a network of communicating pores. This structure is oriented in at least one direction. The thermoplastic polymeric structure may be substantially homogeneous or the porosity of the structure may exhibit a gradient therethrough. The cells typically include void spaces encased by fibrous, lacy, or semi-continuous boundaries.

Microporous TIPS sheet materials can be prepared from known thermoplastic polymers including olefinic, condensation and oxidation polymers. Representative olefinic polymers include high- and low-density polyethylene, polypropylene, polyvinyl polymers, butadiene-containing polymers, and acrylate-containing polymers such as poly(methyl methacrylate). Condensation polymers include polyesters such as poly(ethylene terephthalate) (PET) and poly(butylene terephthalate) (PBT); polyamides such as Nylon™ 6, Nylon 11, Nylon 13, and Nylon 66; polycarbonates; and polysulfones. Poly(phenylene oxide) is representative of the oxidation polymers which can form TIPS sheet materials. Blends of the above thermoplastic polymers can also be used. Preferably, TIPS sheet materials useful in the invention comprise polyolefins, more preferably polyethylene and polypropylene, and most preferably, polypropylene.

Microporous TIPS sheet materials can be prepared using a diluent component that is miscible with the polymer component at a temperature above the melting point of the polymer component but is immiscible at a temperature below the melting point of the polymer. The TIPS sheet material is formed by heating the diluent and polymer above the melting point of the polymer and then cooling the material until a phase separation (either solid/liquid or liquid/liquid) occurs. The diluent may be removed by, for example, extraction with a volatile solvent to leave "diluent-out" TIPS sheet material. Alternatively, the diluent may be retained ("diluent-in" TIPS sheet material). In either case, the TIPS sheet material may be stretched to increase the size of the micropores. In the "diluent-in" material this may result in the formation of air-pockets with the diluent material being distributed in amorphous portions of the material.

It is known from optical physics that incident light or radiation is significantly scattered and diffusely reflected by an article that is made from two or more non-absorbing materials having different refractive indices if the structure of the article provides regions of each material with the appropriate size. To make an efficient diffuse reflector, the size of the light-scattering regions of the article should be on the order of the size of the wavelength of the light to be reflected. If the sizes of the scattering sites are a great deal smaller than the wavelength of interest, the light passes through the article. If the sizes are a great deal larger, the overall thickness required to substantially diffusely reflect most of the light is prohibitively large. It is also known that the efficiency of the reflector is increased as the difference in the refractive index of the diluent and the polymer is increased.

EXAMPLES

In the Examples below, light fibers were from 3M Company (St. Paul, Minn.), catalog LF-120, unless otherwise specified. Brightness measurements were obtained using a Minolta CS-100 luminance meter (Minolta Corp., Instruments Systems, Ramsey, N.J.) equipped with a close-up lens (Minolta Model 122) such that the measurement area was approximately 5 mm in diameter at a distance of approximately 25 mm from the surface to be measured.

Example 1

A channel letter in the shape of the letter "T", as shown in FIG. 6, was constructed from sheet metal. The letter was 61 cm high, the stem of the T was 14 cm wide, the crossbar was 11 cm wide and 46 cm long, and the channel letter was 23 cm deep. All inside surfaces of the channel letter were lined with diluent-out polypropylene TIPS sheet material, 0.35 mm thick, prepared as described in Example 1 of U.S. Pat. No. 4,539,256. A 12 mm "end-light" light fiber was introduced through a hole in the bottom of the stem of the T and positioned such that the end of the light fiber was approximately even with the bottom of the crossbar. The translucent face of the letter, consisting of white poly(methyl methacrylate), such as Plexiglass™, was put in place and the light fiber was lit using a Fostec ACE™ light engine, using a quartz halogen 150 W MR 16 projector bulb (Fostec, Inc., Auburn. N.Y.).

Brightness measurements at five positions on the face of the T averaged 2500 cd/m$^2$. Uniformity of the brightness, defined as the coefficient of variation of the measurements (i.e., 1-(standard deviation/average)) was 0.68. Three of the positions were along the cross bar of the "T" and the other two points were along the stem.

In comparison, the channel letter with the TIPS sheet material removed such that the interior was bare sheet metal was found to have an average brightness of 200 cd/m$^2$ with a uniformity of 0.48. When the bare metal was covered by white paint (Flat White Rust-Oleum™ fast drying enamel spray paint, Rust-Oleum Corp., Vernon Hills, Ill.), brightness increased to 600 cd/m$^2$ with a uniformity of 0.45. This example shows that TIPS diffuse reflectors can increase brightness of a channel letter illuminated by a light fiber by more than four-fold with an accompanying increase in uniformity of approximately 50%.

Example 2

A 12 mm diameter light fiber (Model LF120), 3M, St. Paul, Minn.), 3 meters in length, was mounted in a "C" shaped channel as shown in FIG. 4A. Samples of several diffuse reflective sheet materials were cut to approximately 20 cm in length (except as noted in Table 1) and placed inside the channel, in intimate contact with the light fiber, such that the diffuse reflective sheet material covered the entire inside of the channel, approximately 270° around the circumference of the light fiber. The samples were approximately at the midpoint of the fiber, and one end of the fiber was inserted into a Fostec ACE™ light engine having a quartz halogen 150 W MR 16 projector bulb which was operated at 50% power. The leading edge of the samples was approximately 1.5 meters from the light source.

Light from the light engine was projected into the light fiber, and light output was measured along the length of each sample using a Minolta LS-110 Luminance Meter at a distance of approximately 75 cm from the fiber. Measurement size (footprint on the fiber) was approximately 4 mm.

The samples measured and details of measurement were as follows:

For samples 2A, 2B, and 2C, the brightness was measured directly over the center of the exposed fiber at 5 points along a 20 cm length. Three measurements were made at each point and the reported value is an average of 15 measurements.

For samples 2D through 2K, the brightness was measured directly over the center of the exposed fiber at 5 points along a 20 cm length. Two measurements were made at each point. Two additional measurements were also made at each of the same five points, but at a slight angle below the center of the exposed fiber. The reported value is an average of 20 measurements.

For sample 2L, the sample was 12 cm long. The brightness was measured directly over the center of the exposed fiber at three points along the 12 cm length. Three measurements were made at each point and the reported value is an average of 9 measurements.

For sample 2M, the sample was 8 cm long. The brightness was measured directly over the center of the exposed fiber at 4 points in middle of the 8 cm length. Three measurements were made at each point and the reported value is an average of 12 measurements.

TABLE 1

| Sample | Relative Brightness |
| --- | --- |
| 2A Comparative | 1.00 |
| 2B | 2.97 |
| 2C | 3.16 |
| 2D | 3.92 |
| 2E | 3.95 |
| 2F | 4.08 |
| 2G | 3.19 |
| 2H | 2.98 |
| 2I | 3.48 |
| 2J | 3.05 |
| 2K | 3.17 |
| 2L | 3.79 |
| 2M | 2.85 |

In Table 1, the sample identity is:

2A: Black Heat-Shrink Flexible Polyolefin tubing, (3M, St. Paul, Minn.) (This is a comparative sample.)

2B: Tyvek™ polyethylene nonwoven sheet material (DuPont Chemical Co., Wilmington, Del.), 0.15–0.25 mm thick.

2C: ScotchCal™ opaque white pigmented vinyl sheet material (Series 7725-20, 3M, St. Paul, Minn.), approximately 0.75 mm thick.

2D: Diluent-out polypropylene TIPS sheet material, 0.35 mm thick

2E: Diluent-in polypropylene TIPS sheet material, 0.275 mm thick

2G: Diluent-out polypropylene TIPS sheet material, 0.125 mm thick

2H: Poreflon™ porous poly(tetrafluoroethylene) (PTFE) sheet material, 0.125 mm thick (Sumitomo Electric Co., Osaka, Japan)

2I: Poreflon™, 3 layers

2J: DeWal low density PTFE sheet material, 0.125 mm thick (DeWal Industries, Inc., Saunderstown, R.I.)

2K: DeWal PTFE, 3 layers

2L: Empore™ fibrillated PTFE solid phase extraction medium, comprising approximately 90% by weight styrene-divinylbenzene beads and approximately 10% PTFE, 0.5 mm thick (3M, St. Paul, Minn.)

2M: Empore™ Fibrillated PTFE solid phase extraction medium, comprising approximately 90% by weight alkyl ($C_8$–$C_{12}$) coated silica beads and approximately 10% PTFE, 0.5 mm thick (3M, St. Paul, Minn.)

The data of Table 1 show that a wide variety of diffuse reflective sheet materials are useful in the method of the invention. Variations in brightness can be seen as a function of sample thickness (2F vs. 2G, 2H vs. 2I). Diffuse reflective sheet materials made from polyethylene, polypropylene, particle-loaded fibrillated PTFE, unfilled microporous sintered PTFE, and diluent-in and diluent-out TIPS material showed reflected light having brightness levels of from nearly 3 times to more than 4 times the brightness of light from the article having the comparative black channel liner.

Example 3

A channel letter was formed in the shape of a "W" 12.5 cm deep, with each leg being approximately 47 cm long and 8 cm wide (outside legs) or 7 cm wide (inside legs) and having a width at the bottom of 33 cm and a width at the top of 59 cm. The channel letter was fitted with two 12 mm diameter end-light light fibers (Model LF 120, 3M, St. Paul, Minn.), 90 cm long, which were inserted through the top two ends of the "W" to a distance of 40 cm into the channels. All of the interior walls of the channel letter, except for the translucent cover, were covered by the materials described below. The light fibers were lit by a Lumenyte QL-60 light engine, using a metal halide 150 W bulb (Lumenyte International, Inc., Costa Mesa, Calif.) such that a total of 750 lumens were injected into the channel letter. Brightness measurements were taken orthogonally at a distance of 25 cm from the translucent cover of the channel letter. The brightness was measured at nine points. These points consist of the ends of each leg and the middle of each leg. The brightness is reported as the average of the measurements at the nine points, for each diffuse reflective sheet material used. Results are shown in Table 2.

TABLE 2

| Liner material | Average brightness cd/m$^2$ | Uniformity |
| --- | --- | --- |
| Flat White Paint | 530 | 0.09 |
| TIPS | 1670 | 0.44 |
| Poreflon ™ | 1190 | 0.27 |
| Tyvec ™ | 1140 | 0.31 |

In Table 2, the sample identity is as follows:

"Flat White Paint" is Flat White Rust-Oleum™ fast drying enamel spray paint (Rust-Oleum Corp., Vernon Hills, Ill.);

"TIPS" is one layer of 0.275 mm thick diluent-out polypropylene microvoided sheet material;

"Poreflon™" is three layers of 0.125 mm thick Poreflon™ polytetrafluoroethylene microporous sheet material (Sumitomo Electric Co., Osaka, Japan);

"Tyvec™" means one layer of Tyvec™ nonwoven polyethylene sheet material, 0.15–0.25 mm thick (DuPont Co., Wilmington, Del.);

Uniformity means (1-(standard deviation/average)) for 9 measurements.

The data of Table 2 shows that a wide variety of diffuse reflective sheet materials can be used to line the inside of channel letters that are illuminated by light from light fibers, and that considerable increases in the brightness of emitted light, from 2 to 3 times, can be obtained thereby, with accompanying increases in uniformity of the emitted light.

All publications and patent applications referenced in this specification are indicative of the level of ordinary skill in the art to which this invention pertains. All publications and patent applications are herein incorporated by reference to the same extent as if each individual publication or patent application was specifically and individually indicated by reference.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification. The claims are intended to cover such modifications and devices.

We claim:

1. An article configured for emitting diffuse light in a predetermined set of directions when coupled with a light source, comprising:
   a light fiber having a light receiving end for coupling to the light source, the light fiber emitting light when coupled to the light source, the light fiber comprising a core and a cladding disposed around the core, the cladding having a lower index of refraction than the core and a generally smooth outer surface; and
   a diffuse reflective sheet material disposed around at least a portion of the light fiber to direct at least a portion of the light emitted by the light fiber toward the predetermined set of directions.

2. The article of claim 1, wherein the article further comprises a structure having at least one wall, the light fiber being at least partially disposed within the structure and the diffuse reflective sheet material being disposed on at least an inner portion of the at least one wall.

3. The article of claim 2, wherein the at least one wall comprises a second portion that is transparent to allow emission of light out of the structure.

4. The article of claim 3, wherein the second portion is colored.

5. The article of claim 2, wherein at least a portion of the structure has a form selected from a group consisting of symbols, letters, and numerals.

6. The article of claim 1, wherein the light fiber includes a light extraction portion.

7. The article of claim 1, wherein the light fiber includes a diffuse light extraction portion.

8. The article of claim 1, wherein, when light is provided at the light receiving end of the light fiber, an intensity of light emitted by the article in the predetermined set of directions is at least 25% greater than light emitted in the predetermined set of directions by the article in the absence of the diffuse reflective sheet material.

9. The article of claim 1, wherein the sheet material comprises a polymeric sheet material.

10. The article of claim 1, wherein the light fiber is constructed in the form of a predetermined shape to at least partially resemble a letter, numeral, or symbol.

11. The article of claim 1, wherein the diffuse reflective sheet material is disposed over an anterior portion of the light fiber, the anterior portion running at least partially along a length of the light fiber so that light emitted from the anterior portion of the light fiber is reflected back toward a posterior portion of the light fiber.

12. The article of claim 1, wherein the light fiber and the diffuse reflective sheet material are separated by a space.

13. The article of claim 1, wherein the light fiber and the diffuse reflective sheet material are in contact with each other.

14. The article of claim 1, wherein the diffuse reflective sheet material reflects at least about 90% of light having a wavelength of 550 nm.

15. The article of claim 1, wherein the diffuse reflective sheet material comprises a microvoided sheet material.

16. The article of claim 15, wherein the microvoided sheet material is a sheet material formed by thermally induced phase separation.

17. The article of claim 1, wherein the diffuse reflective sheet material comprises a microporous material.

18. The article of claim 1, wherein the diffuse reflective material comprises polytetrafluoroethylene.

19. An illuminated article comprising:
   a light source;
   a light fiber having a light receiving end coupled to the light source to receive light therefrom, the light fiber comprising a core and a cladding disposed around the core, the cladding having a lower index of refraction than the core and a generally smooth outer surface; and
   a diffuse reflective sheet material disposed around at least a portion of the light fiber to direct light emitted from the light fiber toward a predetermined set of direction.

20. The illuminated article of claim 19, wherein the illuminated article further comprises a structure having one or more walls, wherein at least a portion of the light fiber is disposed within the structure and the diffuse reflective sheet material is disposed on an inner portion of at least one of the walls.

21. A method of making a diffusive illumination device, comprising:
   disposing a diffuse reflective sheet material around at least a portion of a light fiber, the light fiber comprising a core and a cladding disposed around the core, the cladding having a lower index of refraction than the core and a generally smooth outer surface.

22. The method of claim 21, wherein the method further comprises disposing the light fiber in a structure having at least one wall.

23. The method of claim 22, wherein disposing the diffuse reflective sheet material comprises covering at least an inner portion of the at least one wall of the structure with the diffuse reflective sheet material.

24. The method of claim 23, wherein covering at least a portion of the at least one wall comprises attaching the sheet material to the portion.

25. A method of providing diffuse illumination in a predetermined set of directions, comprising:
   disposing a diffuse reflective sheet material around at least a portion of a light fiber to direct light emitted from the light fiber in the predetermined set of direction, the light fiber comprising a core and a cladding disposed around the core, the cladding having a lower index of refraction than the core and a generally smooth outer surface; and
   coupling a light source to a receiving end of the light fiber.

26. The article of claim 2, wherein the at least one wall comprises a second portion that is translucent to allow emission of light out of the structure.

27. The article of claim 26, wherein the second portion is colored.

* * * * *

UNITED STATES PATENT AND TRADEMARK OFFICE
CERTIFICATE OF CORRECTION

PATENT NO. : 6,123,442  
DATED : September 26, 2000  
INVENTOR(S) : David George Freier, Cheryl Annette Vrieze It is certified that error appears in the above-identified patent and that said Letters Patent is hereby corrected as shown below:

<u>Column 4,</u>  
Line 21, "sidelight" should read -- side-light --.

Signed and Sealed this

Second Day of April, 2002

Attest:

JAMES E. ROGAN  
*Attesting Officer*  *Director of the United States Patent and Trademark Office*